Dec. 14, 1965

W. A. WARD 3,223,884

GASEOUS-DISCHARGE DEVICE

Filed Sept. 26, 1961

*INVENTOR.*
WILLIAM A. WARD

BY Ralph L. Cadwallader

ATTORNEY

United States Patent Office 3,223,884

Patented Dec. 14, 1965

3,223,884

GASEOUS-DISCHARGE DEVICE

William A. Ward, Norwood, Mass., assignor to Edgerton, Germeshausen & Grier, Inc., Boston, Mass., a corporation of Massachusetts Filed Sept. 26, 1961, Ser. No. 140,826
2 Claims. (Cl. 315—60)

The present invention relates to gaseous-discharge devices and more particularly to gaseous-discharge flashtubes having a plurality of probe-type trigger or control electrodes such as is disclosed in United States Letters Patent No. 2,977,508 issued on March 28, 1961, to Kenneth J. Germeshausen.

Since such flashtubes are new to the electric-flash art, the art of operating them under different conditions and for different purposes has not had time to develop. Nor, for that matter, are all the factors that contribute to successful operation of this flashtube under different conditions well understood. Thus, for example, it was not known that difficulty would be encountered in firing such a flashtube in darkness. The mechanisms that caused the difficulty were imperfectly understood until it was discovered that production of light with a small trigger gap removed the difficulty, as disclosed in U.S. patent application No. 78,587, filed on December 27, 1960, by Kenneth J. Germeshausen and John L. Turner.

During the development of the art pertaining to this flashtube, an important object has been to reduce and miniaturize the circuitry needed to operate the tube. I have discovered and developed a modification of this flashtube which aids in achieving this objective. In summary, my invention eliminates the necessity for connecting separate isolating capacitors to the trigger pins as disclosed in said U.S. Letters Patent. In lieu thereof, I provide an insulating coating on each trigger pin. When the flashtube is then inserted in a tube socket, an isolating capacitance exists between each trigger pin and its associated pin socket. This capacitance is sufficient to perform the functions of the isolating capacitors disclosed in said Letters Patent.

Other objects and a fuller understanding of the invention will be had by referring to the following description and the accompanying drawings in which.

Figures 1, 2:
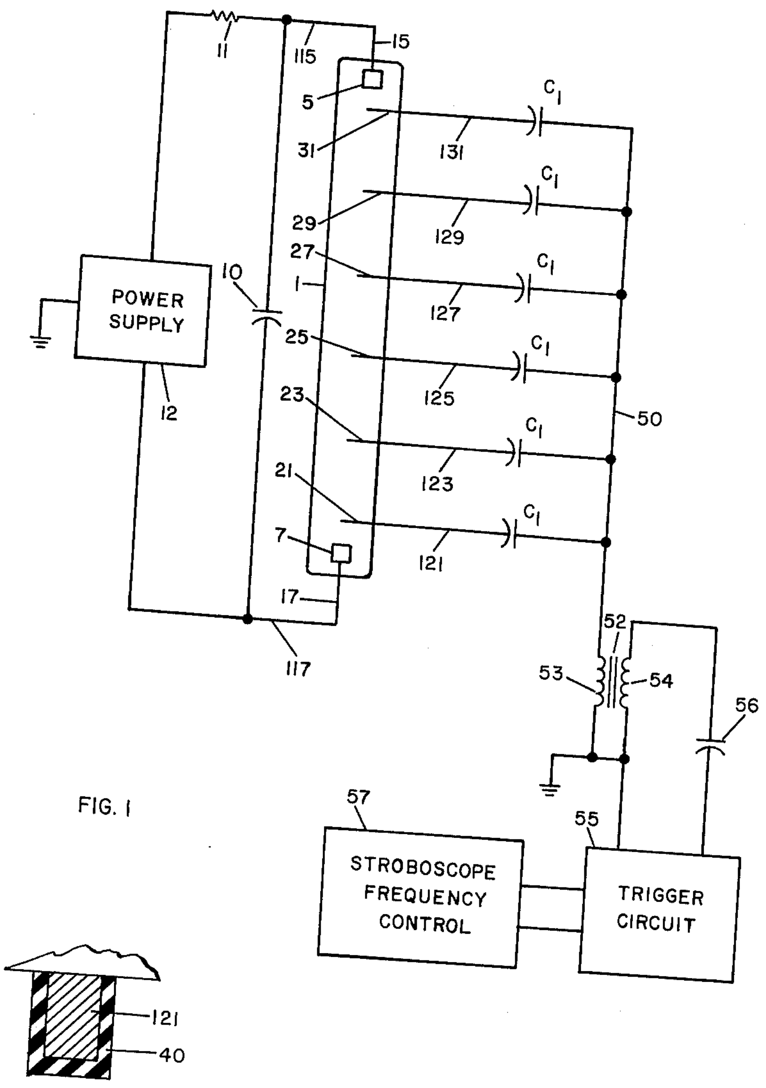
FIGURE 1 is a schematic diagram illustrating a circuit that may be utilized to operate the flashtube of said Letters Patent.
FIGURE 2 is a partial cutaway showing partially in section one embodiment of my invention.

The operation of the circuit of FIGURE 1 is similar to that disclosed in said Letters Patent. A direct current power supply 12 charges discharge capacitor 10 through impedance 11, which may be a resistor or inductor, as is well known in the art. The voltage on capacitor 10 during charging, and after it is charged, appears across anode 5 and cathode 7 of flashtube 1 by way of conductor 115 and pin 15, and conductor 117 and pin 17, respectively, as illustrated.

Trigger probes 21, 23, 25, 27, 29 and 31 are each connected through respective pins 121, 123, 125, 127, 19 and 131 to a terminal of each of separate isolating capacitors $C_1$. The other terminals of isolating capacitors $C_1$ are connected by common line 50 to one terminal of the secondary winding 53 of pulse transformer 52. The other terminal of secondary winding 53 is connected in common with one terminal of primary winding 54 to one output terminal of trigger circuit 55, which may be grounded. The other terminal of primary winding 54 is connected through discharge capacitor 56 to the other terminal of trigger circuit 55. Trigger circuit 55 may comprise a thyratron or other switching circuit adapted to charge capacitor 56 and to discharge it through primary winding 54 to produce a trigger pulse in secondary winding 53. Trigger circuit 55 may be controlled by a stroboscope frequency control 57 such as that illustrated in United States Letters Patent No. 2,331,317, issued on October 12, 1943, to Kenneth J. Germeshausen.

Upon receipt of a signal from stroboscope frequency control 57, trigger circuit 55 operates, discharging discharge capacitor 56 into primary winding 54 of pulse transformer 52. The triger pulse created in secondary winding 53 is transmitted through isolating capacitors $C_1$ to trigger probes 21, 23, 25, 27, 29 and 31. Flashtube 1 breaks down from cathode 7 to trigger probe 21; thence to probe 23 and so on to anode 5 as explained in said Letters Patent No. 2,977,508. A brilliant flash of light is produced.

As heretofore stated, my invention eliminates separate capacitors $C_1$. In the embodiment of FIGURE 2, pin 121 of flashtube 1 is shown with a coating of insulative material 40. This insulative coating 40 may be applied in one of many well known ways. It can, for example, be applied by spraying a liquid insulative material on trigger pins 121, 123, 125, 127, 129 and 131, which adheres thereto and hardens. Or, said pins may be dipped into a liquid insulating material which adheres to and subsequently hardens on the pins. Obviously pins 15 and 17 will have to be masked during his process. The thickness of insulating coating 40 may be controlled by means well known in the art.

Figure 4:
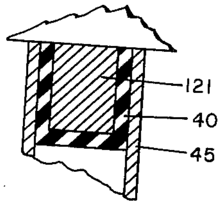
FIGURE 4 illustrates the embodiment of FIGURE 2 inserted in a pin socket of a tube socket.

When flashtube 1, having trigger pins so coated, is inserted into a miniature tube socket (not shown) pin 121 (for example) and its insulative coating 40 fits into its corresponding pin socket 45 as illustrated in FIGURE 4. It is to be understood, that the inside diameter of pin socket 45 is governed by the outside diameter of insulative coating 40. A close, firm fit between them is desired. The fit should not be so tight as to damage insulative coating 40 when flashtube 1 is removed from the tube socket.

It will be obvious that pin 121 and pin socket 45 form the plates of a small capacitor in which insulative coating 40 is the dielectric material. I have found this capacitance sufficient to perform admirably the isolating function of capacitor $C_1$. Reduction and miniaturization of the operating circuit is therefore aided by the elimination of capacitor $C_1$.

Figure 3:
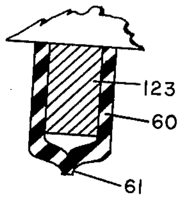
FIGURE 3 is similar to FIGURE 2 showing another embodiment.

An alternative embodiment is illustrated in FIGURE 3. Here, a small section of insulating tubing 60 is shrunk-fit on pin 123 and end 61 thereof is sealed, both by well known means. Likewise, this combination will fit into pin socket 45.

The embodiments herein disclosed are purely illustrative. Other modifications in construction and arrangement will occur to those skilled in the art and all such are deemed to be within the scope of my invention as defined in the appended claims.

I claim:

1. In a gaseous-discharge device having a gas-filled envelope, an anode located within the envelope, a cathode spaced from the anode within the envelope, a plurality of wire probe type trigger electrodes spaced from each other and disposed in the space between the anode and the cathode, said anode, cathode and trigger electrodes each connected to conductive pins extending through the glass envelope, a tube socket having means for engaging the conductive pins to an operative circuit, the improvement comprising a coating of insulating material on each of the trigger electrode pins, said insulating material being located on the portion of each trigger electrode pin exterior to said envelope, whereby a capacitance is serially connected with each trigger electrode pin when inserted in said tube socket.

2. A discharge device as in claim 1, in which said insulative material comprises insulating tubing shrunk-fit on each of said trigger pins.

References Cited by the Examiner

UNITED STATES PATENTS

| | | | |
|---|---|---|---|
| 2,421,780 | 6/1947 | Frear | 317—257 |
| 2,477,688 | 8/1949 | Dyer | 317—249 |
| 2,643,362 | 6/1953 | Johansson | 317—110 |
| 2,977,508 | 3/1961 | Germeshausen | 315—241 |

JOHN W. HUCKERT, *Primary Examiner.*

JAMES D. KALLAM, DAVID J. GALVIN, *Examiners.*

R. F. POLISSACK, *Assistant Examiner.*